US012676919B2

(12) United States Patent
Rost et al.

(10) Patent No.: US 12,676,919 B2
(45) Date of Patent: Jul. 7, 2026

(54) METHOD AND APPARATUS FOR USE IN MULTI-PROTOCOL COMMUNICATION TECHNIQUES

(71) Applicant: Nokia Technologies Oy, Espoo (FI)

(72) Inventors: Peter Rost, Munich (DE); Rakash Sivasiva Ganesan, Munich (DE); Colin Kahn, Murray Hill, NJ (US)

(73) Assignee: Nokia Technologies Oy, Espoo (FI)

( * ) Notice: Subject to any disclaimer, the term of this patent is extended or adjusted under 35 U.S.C. 154(b) by 276 days.

(21) Appl. No.: 18/264,745

(22) PCT Filed: Feb. 9, 2021

(86) PCT No.: PCT/IB2021/051041
§ 371 (c)(1),
(2) Date: Aug. 8, 2023

(87) PCT Pub. No.: WO2022/172052
PCT Pub. Date: Aug. 18, 2022

(65) Prior Publication Data
US 2024/0114081 A1     Apr. 4, 2024

(51) Int. Cl.
*H04L 69/08* (2022.01)
*H04W 76/20* (2018.01)

(52) U.S. Cl.
CPC ............. *H04L 69/08* (2013.01); *H04W 76/20* (2018.02)

(58) Field of Classification Search
None
See application file for complete search history.

(56) References Cited

U.S. PATENT DOCUMENTS

| | | | |
|---|---|---|---|
| 11,490,450 B1 * | 11/2022 | Balmakhtar | H04L 69/08 |
| 2020/0404731 A1 * | 12/2020 | Speicher | H04W 76/11 |
| 2021/0112127 A1 * | 4/2021 | Zhu | H04L 69/321 |
| 2021/0212069 A1 * | 7/2021 | Moon | H04W 28/24 |
| 2022/0132623 A1 * | 4/2022 | Xu | H04W 76/10 |

* cited by examiner

*Primary Examiner* — Lonnie V Sweet
(74) *Attorney, Agent, or Firm* — Lippes Mathias LLP

(57) ABSTRACT

A technique comprising: detecting, at a user plane function of a system operating according to a first protocol, a message regarding use of resources and/or services of the system for a service according to a second protocol; and directing the message from the user plane function to a control plane function operating as a control plane translator between the first and second protocols.

23 Claims, 6 Drawing Sheets

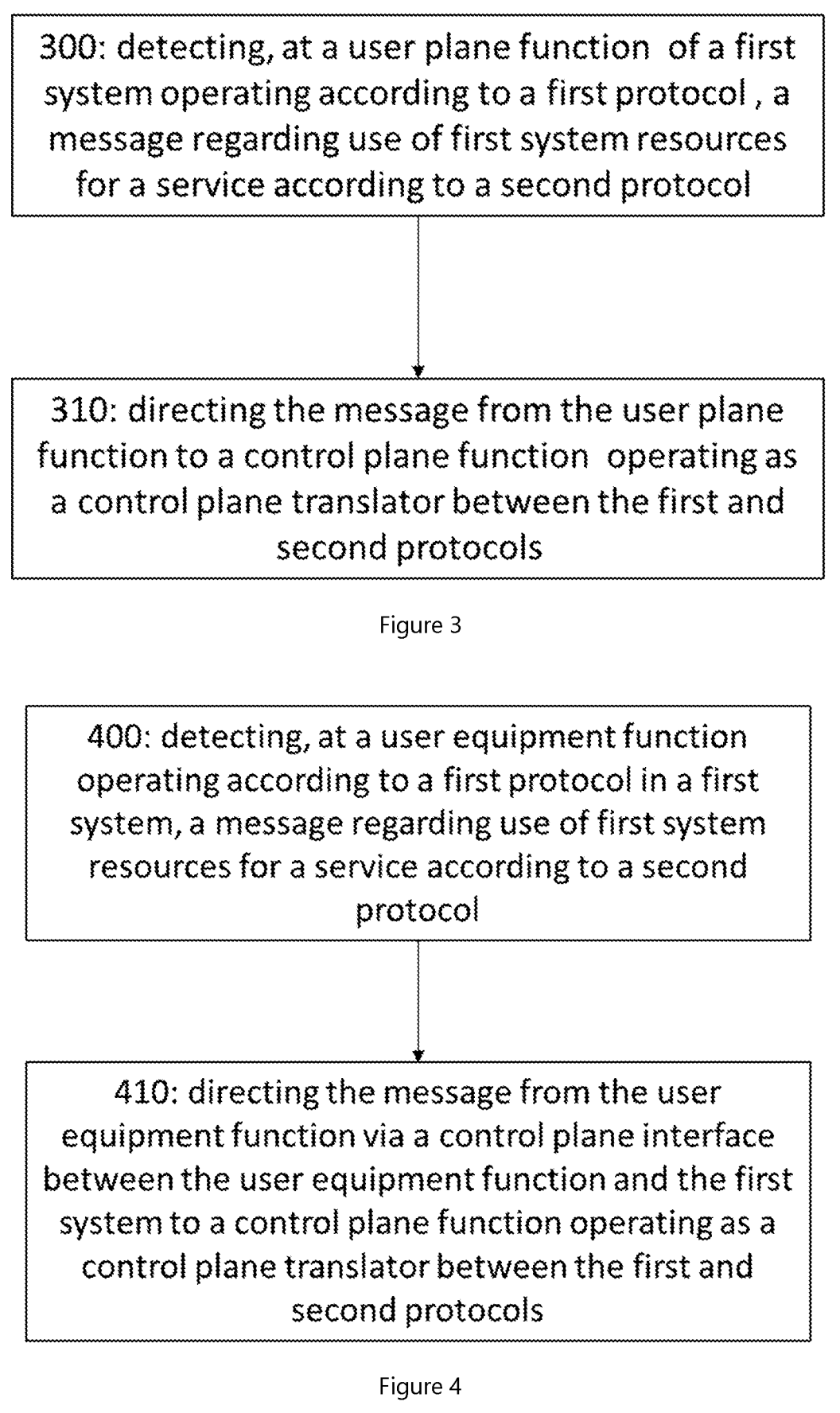

300: detecting, at a user plane function of a first system operating according to a first protocol, a message regarding use of first system resources for a service according to a second protocol 310: directing the message from the user plane function to a control plane function operating as a control plane translator between the first and second protocols

Figure 3

400: detecting, at a user equipment function operating according to a first protocol in a first system, a message regarding use of first system resources for a service according to a second protocol 410: directing the message from the user equipment function via a control plane interface between the user equipment function and the first system to a control plane function operating as a control plane translator between the first and second protocols

Figure 4

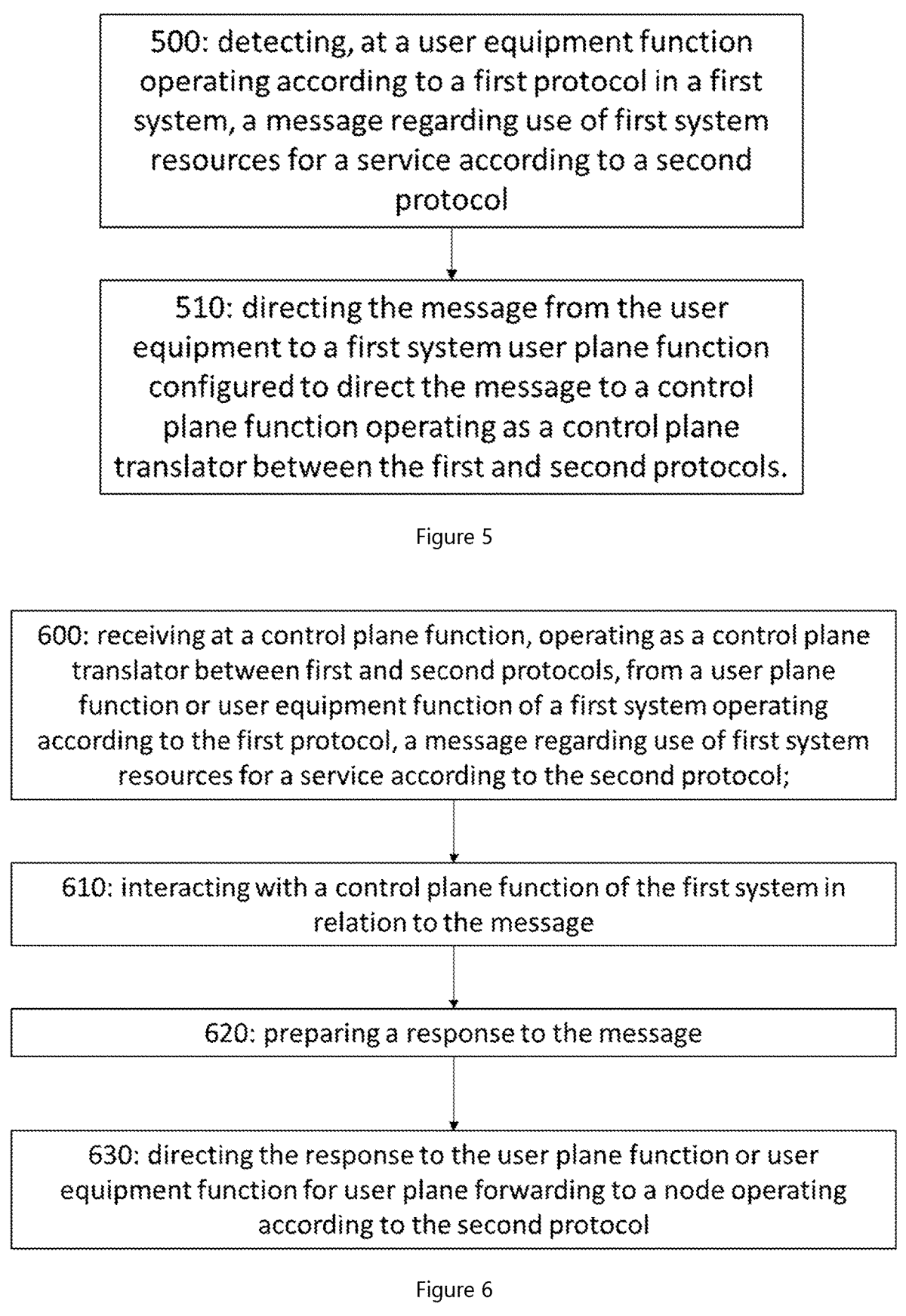

500: detecting, at a user equipment function operating according to a first protocol in a first system, a message regarding use of first system resources for a service according to a second protocol 510: directing the message from the user equipment to a first system user plane function configured to direct the message to a control plane function operating as a control plane translator between the first and second protocols.

Figure 5

600: receiving at a control plane function, operating as a control plane translator between first and second protocols, from a user plane function or user equipment function of a first system operating according to the first protocol, a message regarding use of first system resources for a service according to the second protocol;

610: interacting with a control plane function of the first system in relation to the message 620: preparing a response to the message 630: directing the response to the user plane function or user equipment function for user plane forwarding to a node operating according to the second protocol

Figure 6

NO CENTRALISED NETWORK CONFIGURATION

No direct control plane connection between endpoints and CNC

METHOD AND APPARATUS FOR USE IN MULTI-PROTOCOL COMMUNICATION TECHNIQUES

RELATED APPLICATION

This application was originally filed as PCT Application No. PCT/IB2021/051041, filed on Feb. 9, 2021, which is incorporated herein by reference in its entirety.

TECHNICAL FIELD

The present disclosure relates to an apparatus, a method, and a computer program and in particular but not exclusively for an apparatus, methods and computer programs for use in multi-protocol communication techniques.

BACKGROUND

A communication technique may involve a communication system operating according to a first protocol using resources and/or services of a communication system operating according to a second protocol.

SUMMARY

A method, comprising: detecting, at a user plane function of a system operating according to a first protocol, a message regarding use of resources and/or services of the system for a service according to a second protocol; and directing the message from the user plane function to a control plane function operating as a control plane translator between the first and second protocols.

Directing the message from the user plane function to the control plane function may comprise directing the message via the user plane.

Directing the message from the user plane function to the control plane function via the user plane may comprise adding an encapsulation outer header to the message.

Directing the message from the user plane function to the control plane function may comprise directing the message via the control plane of the system.

Directing the message from the user plane function to the control plane function via the control plane of the system may comprise using a container protocol.

Directing the message from the user plane function to the control plane function via the control plane of the system may comprise using a port management information container.

The message may be a stream reservation message or a resource allocation message according to the second protocol.

The resources of the system may comprise radio resources.

The first protocol may be a 3GPP protocol and the second protocol may be a IEEE protocol.

A method, comprising: detecting, at a user equipment function operating according to a first protocol in a system, a message regarding use of resources and/or services of the system for a service according to a second protocol; and either (i) directing the message from the user equipment function via a control plane interface between the user equipment function and the system to a control plane function operating as a control plane translator between the first and second protocols, or (ii) directing the message from the user equipment to a user plane function configured to direct the message to a control plane function operating as a control plane translator between the first and second protocols.

Directing the message from the user equipment function to the control plane function via the control plane of the system may comprise using a container protocol.

Directing the message from the user equipment function to the control plane function via the control plane of the system may comprise using a port management information container.

The message may be a stream reservation message or a resource allocation message according to the second protocol.

The system resources may comprise radio resources.

The first protocol may be a 3GPP protocol and the second protocol may be a IEEE protocol.

A method comprising: receiving at a control plane function from a user plane function or user equipment function of a system operating according to a first protocol, a message regarding use of resources and/or services of the system for a service according to a second protocol, wherein the control plane function operates as a control plane translator between the first and second protocols; interacting with a control plane function of the system in relation to the message; preparing a response to the message; and directing the response to the user plane function or user equipment function for user plane forwarding to a node operating according to the second protocol.

Directing the response from the control plane function to the user plane function or user equipment function may comprise directing the response via the user plane.

Directing the response from the control plane function to the user plane function or user equipment function may comprise directing the response via the control plane of the system.

Directing the response from the control plane function to the user plane function or user equipment function via the control plane of the system may comprise using a container protocol.

Directing the response from the control plane function to the user plane function or user equipment function via the control plane of the system may comprise using a port management information container.

The message may be a stream reservation message or a resource allocation message according to the second protocol.

The system resources may comprise radio resources.

The first protocol may be a 3GPP protocol and the second protocol may be a IEEE protocol.

An apparatus comprising: at least one processor; and at least one memory including computer program code, the at least one memory and computer program code configured to, with the at least one processor, cause the apparatus to perform: detecting, at a user plane function of a system operating according to a first protocol, a message regarding use of resources and/or services of the system for a service according to a second protocol; and directing the message from the user plane function to a control plane function operating as a control plane translator between the first and second protocols.

The at least one memory and computer program code may be configured to, with the at least one processor, cause the apparatus to direct the message from the user plane function to the control plane function via the user plane.

The at least one memory and computer program code may be configured to add an encapsulation outer header to the message.

The at least one memory and computer program code may be configured to, with the at least one processor, cause the apparatus to direct the message from the user plane function to the control plane function via the control plane of the system.

The at least one memory and computer program code may be configured to, with the at least one processor, cause the apparatus to direct the message from the user plane function to the control plane function via the control plane of the system using a container protocol.

The at least one memory and computer program code may be configured to, with the at least one processor, cause the apparatus to direct the message from the user plane function to the control plane function via the control plane of the system using a port management information container.

The message may be a stream reservation message or a resource allocation message according to the second protocol.

The resources of the system may comprise radio resources.

The first protocol may be a 3GPP protocol and the second protocol may be a IEEE protocol.

An apparatus comprising: at least one processor; and at least one memory including computer program code, the at least one memory and computer program code configured to, with the at least one processor, cause the apparatus to perform: detecting, at a user equipment function operating according to a first protocol in a system, a message regarding use of resources and/or services of the system for a service according to a second protocol; and either (i) directing the message from the user equipment function via a control plane interface between the user equipment function and the system to a control plane function operating as a control plane translator between the first and second protocols, or (ii) directing the message from the user equipment to a user plane function configured to direct the message to a control plane function operating as a control plane translator between the first and second protocols.

The at least one memory and computer program code may be configured to, with the at least one processor, cause the apparatus to direct the message from the user equipment function to the control plane function via the control plane of the system using a container protocol.

The at least one memory and computer program code may be configured to, with the at least one processor, cause the apparatus to direct the message from the user equipment function to the control plane function via the control plane of the system using a port management information container.

The message may be a stream reservation message or a resource allocation message according to the second protocol.

The system resources may comprise radio resources.

The first protocol may be a 3GPP protocol and the second protocol may be a IEEE protocol.

An apparatus comprising: at least one processor; and at least one memory including computer program code, the at least one memory and computer program code configured to, with the at least one processor, cause the apparatus to perform: receiving at a control plane function from a user plane function or user equipment function of a system operating according to a first protocol, a message regarding use of resources and/or services of the system for a service according to a second protocol, wherein the control plane function operates as a control plane translator between the first and second protocols; interacting with a control plane function of the system in relation to the message; preparing a response to the message; and directing the response to the user plane function or user equipment function for user plane forwarding to a node operating according to the second protocol.

The at least one memory and computer program code may be configured to, with the at least one processor, cause the apparatus to direct the response from the control plane function to the user plane function or user equipment function via the user plane.

The at least one memory and computer program code may be configured to, with the at least one processor, cause the apparatus to direct the response from the control plane function to the user plane function or user equipment function via the control plane of the system.

The at least one memory and computer program code may be configured to, with the at least one processor, cause the apparatus to direct the response from the control plane function to the user plane function or user equipment function via the control plane using a container protocol.

The at least one memory and computer program code may be configured to, with the at least one processor, cause the apparatus to direct the response from the control plane function to the user plane function or user equipment function via the control plane of the system using a port management information container.

The message may be a stream reservation message or a resource allocation message according to the second protocol.

The system resources may comprise radio resources.

The first protocol may be a 3GPP protocol and the second protocol may be a IEEE protocol.

Apparatus, comprising: means for detecting, at a user plane function of a system operating according to a first protocol, a message regarding use of resources and/or services of the system for a service according to a second protocol; and means for directing the message from the user plane function to a control plane function operating as a control plane translator between the first and second protocols.

Apparatus, comprising: means for detecting, at a user equipment function operating according to a first protocol in a system, a message regarding use of resources and/or services of the system for a service according to a second protocol; and means for either (i) directing the message from the user equipment function via a control plane interface between the user equipment function and the system to a control plane function operating as a control plane translator between the first and second protocols, or (ii) directing the message from the user equipment to a user plane function configured to direct the message to a control plane function operating as a control plane translator between the first and second protocols.

Apparatus comprising: means for receiving at a control plane function from a user plane function or user equipment function of a system operating according to a first protocol, a message regarding use of resources and/or services of the system for a service according to a second protocol, wherein the control plane function operates as a control plane translator between the first and second protocols; means for interacting with a control plane function of the system in relation to the message; means for preparing a response to the message; and means for directing the response to the user plane function or user equipment function for user plane forwarding to a node operating according to the second protocol.

Apparatus, comprising: detecting circuitry for detecting, at a user plane function of a system operating according to a first protocol, a message regarding use of resources and/or services of the system for a service according to a second protocol; and directing circuitry for directing the message from the user plane function to a control plane function operating as a control plane translator between the first and second protocols.

Apparatus, comprising: detecting circuitry for detecting, at a user equipment function operating according to a first protocol in a system, a message regarding use of resources and/or services of the system for a service according to a second protocol; and directing circuitry for either (i) directing the message from the user equipment function via a control plane interface between the user equipment function and the system to a control plane function operating as a control plane translator between the first and second protocols, or (ii) directing the message from the user equipment to a user plane function configured to direct the message to a control plane function operating as a control plane translator between the first and second protocols.

Apparatus comprising: receiving circuitry for receiving at a control plane function from a user plane function or user equipment function of a system operating according to a first protocol, a message regarding use of resources and/or services of the system for a service according to a second protocol, wherein the control plane function operates as a control plane translator between the first and second protocols; interacting circuitry for interacting with a control plane function of the system in relation to the message;

preparing circuitry for preparing a response to the message; and directing circuitry for directing the response to the user plane function or user equipment function for user plane forwarding to a node operating according to the second protocol.

A computer readable medium comprising program instructions stored thereon for performing: detecting, at a user plane function of a system operating according to a first protocol, a message regarding use of resources and/or services of the system for a service according to a second protocol; and directing the message from the user plane function to a control plane function operating as a control plane translator between the first and second protocols.

A computer readable medium comprising program instructions stored thereon for performing: detecting, at a user equipment function operating according to a first protocol in a system, a message regarding use of resources and/or services of the system for a service according to a second protocol; and either (i) directing the message from the user equipment function via a control plane interface between the user equipment function and the system to a control plane function operating as a control plane translator between the first and second protocols, or (ii) directing the message from the user equipment to a user plane function configured to direct the message to a control plane function operating as a control plane translator between the first and second protocols.

A computer readable medium comprising program instructions stored thereon for performing: comprising: receiving at a control plane function from a user plane function or user equipment function of a system operating according to a first protocol, a message regarding use of resources and/or services of the system for a service according to a second protocol, wherein the control plane function operates as a control plane translator between the first and second protocols; interacting with a control plane function of the system in relation to the message; preparing a response to the message; and directing the response to the user plane function or user equipment function for user plane forwarding to a node operating according to the second protocol.

A non-transitory computer readable medium comprising program instructions stored thereon for performing: detecting, at a user plane function of a system operating according to a first protocol, a message regarding use of resources and/or services of the system for a service according to a second protocol; and directing the message from the user plane function to a control plane function operating as a control plane translator between the first and second protocols.

A non-transitory computer readable medium comprising program instructions stored thereon for performing: detecting, at a user equipment function operating according to a first protocol in a system, a message regarding use of resources and/or services of the system for a service according to a second protocol; and either (i) directing the message from the user equipment function via a control plane interface between the user equipment function and the system to a control plane function operating as a control plane translator between the first and second protocols, or (ii) directing the message from the user equipment to a user plane function configured to direct the message to a control plane function operating as a control plane translator between the first and second protocols.

A non-transitory computer readable medium comprising program instructions stored thereon for performing: receiving at a control plane function from a user plane function or user equipment function of a system operating according to a first protocol, a message regarding use of resources and/or services of the system for a service according to a second protocol, wherein the control plane function operates as a control plane translator between the first and second protocols; interacting with a control plane function of the system in relation to the message; preparing a response to the message; and directing the response to the user plane function or user equipment function for user plane forwarding to a node operating according to the second protocol.

A computer program comprising computer executable code which when run on at least one processor is configured to cause an apparatus at least to: detect, at a user plane function of a system operating according to a first protocol, a message regarding use of resources and/or services of the system for a service according to a second protocol; and direct the message from the user plane function to a control plane function operating as a control plane translator between the first and second protocols.

A computer program comprising computer executable code which when run on at least one processor is configured to cause an apparatus at least to: detect, at a user equipment function operating according to a first protocol in a system, a message regarding use of resources and/or services of the system for a service according to a second protocol; and either (i) directing the message from the user equipment function via a control plane interface between the user equipment function and the system to a control plane function operating as a control plane translator between the first and second protocols, or (ii) directing the message from the user equipment to a user plane function configured to direct the message to a control plane function operating as a control plane translator between the first and second protocols.

A computer program comprising computer executable code which when run on at least one processor is configured to cause an apparatus at least to: receive at a control plane function from a user plane function or user equipment function of a system operating according to a first protocol, a message regarding use of resources and/or services of the system for a service according to a second protocol, wherein the control plane function operates as a control plane translator between the first and second protocols; interact with a control plane function of the system in relation to the message; prepare a response to the message; and direct the response to the user plane function or user equipment function for user plane forwarding to a node operating according to the second protocol.

A non-volatile tangible memory medium comprising program instructions stored thereon for performing any of the methods described above.

In the above, many different aspects have been described. It should be appreciated that further aspects may be provided by the combination of any two or more of the aspects described above.

Various other aspects are also described in the following detailed description and in the attached claims.

BRIEF DESCRIPTION OF THE FIGURES

Some example embodiments will now be described in further detail, by way of example only, with reference to the following examples and accompanying drawings, in which:

FIG. 3 shows a representation of operations of a user plane function according to some example embodiments;

FIGS. 4 and 5 show representations of operations of a user equipment function according to some example embodiments;

FIG. 6 shows a representation of operations of a control plane translator function according to some example embodiments;

DETAILED DESCRIPTION

The following detailed description focusses on the example of a IEEE (Institute of Electrical and Electronics Engineers) Time-Sensitive-Networking (TSN) system according to the IEEE 802.1Q protocol using resources of a 5G system (5GS) operating according to one or more 3GPP ($3^{rd}$ Generation Partnership Project) protocols, but the technique is also applicable to other combinations of systems operating according to different protocols.

IEEE 802.1Q TSN is a OSI model (Open Systems Interconnection model) Layer 2 technology. The forwarding decisions made by the TSN bridges use the Ethernet header contents, not the IP address. 5G is not a IEEE 802 local area network (LAN) technology and, thus, cannot be directly integrated with Ethernet TSN standards at Layer 2. A 5G system may be used as a TSN bridge, by providing user plane translator functions (Network TSN Translator (NW-TT) and Device-side TSN Translator (DS-TT)) at the edges of the 5G system (i.e. the ingress and egress points of the 5G system).

Figure 7:
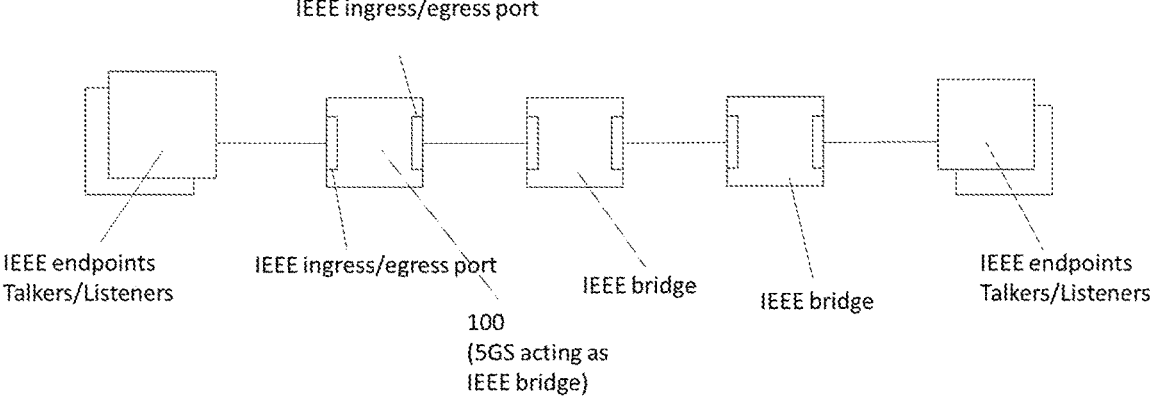
FIG. 7 shows a representation of an example of the use of the functions/elements of FIGS. 1 and 2 for processing in-band signalling in a IEEE Time-Sensitive-Network (TSN) Fully Distributed Configuration model.
Figure 8:
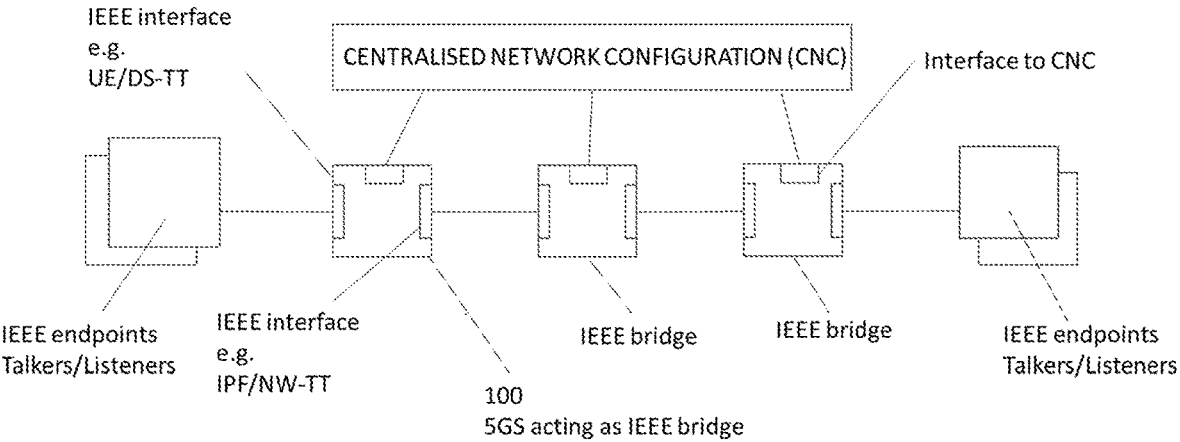
FIG. 8 shows a representation of an example of another use of the functions/elements of FIGS. 1 and 2 for processing in-band signalling in a IEEE TSN Centralized Network Distributed User configuration model.

By way of example, the following detailed description focuses on the example of using a 3GPP 5G System (5GS) 100 as a TSN bridge in a TSN Fully Distributed Configuration model, represented in FIG. 7. Some of the advantages of the TSN Fully Distributed Configuration model compared to the TSN Fully Centralised Configuration model, are as follows. (a) No per-service pre-planning is required; the control signalling is less significant and complex, and scales linearly with user plane traffic. (b) Network resources can be added/removed as needed; and (c) the 5GS resources are allocated on-demand and as needed; there is less risk of over-provisioning of 5GS resources. As mentioned further below, another example use is in a TSN Centralized Network Distributed User configuration model (represented in FIG. 8), in which a 5G system 100 is the first hop bridge.

In the TSN Fully Distributed Configuration model (comprising a distributed network of bridges and end stations), the control signalling (such as the signalling for registering and advertising data streams and reserving bridge resources to provide quality-of-service (QoS) guarantees for the TSN data stream) is in-band signalling. The control signalling is sent within the same band or channel used for the data streams associated with the control signalling.

Figure 1:
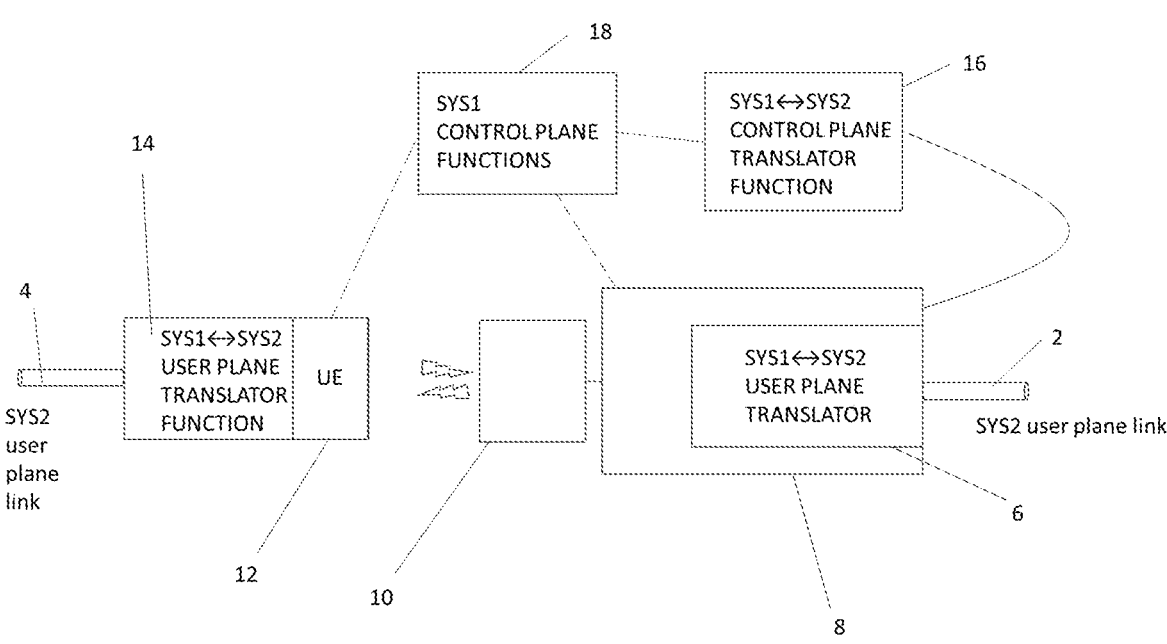
FIG. 1 shows a representation of an example of interacting functions/elements according to some example embodiments.
Figure 2:
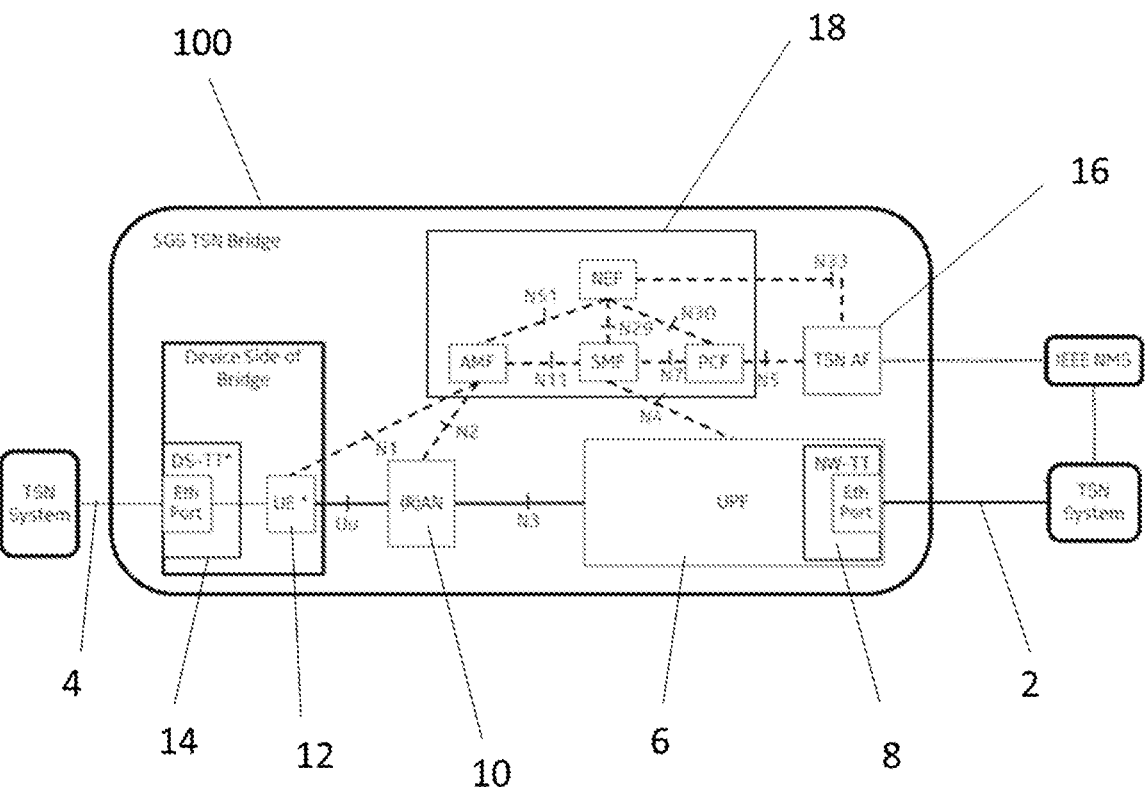
FIG. 2 shows a representation of one example of the interacting functions/elements of FIG. 1.

With particular reference to FIG. 2: upon reception at the UPF 6 of an IP packet or Ethernet frame via the NW-TT 8, the UPF 6 applies packet detection rules (such as the Packet Detection Rules (PDR) specified at TS 23.501, § 5.8.2.11.3). A packet detection rule may be associated with a forwarding action rule (FAR) defining how a packet shall be buffered, dropped or forwarded, including packet encapsulation/decapsulation and forwarding destination.

Packets detected at the UPF 6 to be part of a TSN data stream for which 5GS resources have already been reserved are processed by the UPF in accordance with the respective forwarding action rule for the TSN data stream, and forwarded to one or more base stations (gNB) of the radio access network (RAN) 10, for transmitting to one or more user equipment functions 12.

FIG. 3 shows a representation of the operations of the UPF 6 according to an example embodiment.

The UPF 6 detects that a packet received via a NW-TT 8 port comprises IEEE TSN control signalling (such as control signalling relating to the reservation of 5GS resources for a new TSN data stream) (STEP 300). For example, the UPF 6, may detect that a received packet comprises an IEEE stream reservation protocol (SRP) message or IEEE resource allocation protocol (RAP) message. For example, the UPF 6 may detect that the value of the EtherType two-octet field in an incoming Ethernet frame is set to Hexadecimal 0x22EA indicating that the frame contains a Multiple Stream Registration Protocol (MSRP) message. MSRP is used to register and advertise data streams and reserve bridge resources to provide the QoS guarantees for TSN.

The UPF 6 directs the IEEE TSN control signalling message (e.g. MSRP message) to a control plane translator function TSN-AF 16 (STEP 310). For example, the UPF 6 may operate according to a forwarding action rule (FAR) stored at the UPF 6 that specifies forwarding any message including IEEE control signalling (e.g. any message for which the EtherType field indicates a IEEE SRP/RAP message such as a MSRP message) to control plane translator function TSN-AF 16.

The FAR according to which the UPF 6 directs IEEE TSN control signalling to the control plane translator function (TSN-AF) 16 may be part of a dedicated forwarding rule for forwarding user-plane traffic to the control plane translator function TSN-AF 16. The FAR is provided to the UPF 6 via 5GS control plane function SMF (session management function). The FAR according to which the UPF 6 directs IEEE TSN control signalling to the control plane translator function TSN-AF 16 may include: (i) setting the TSN-AF 16 as a destination interface; (ii) identifying the interface (or port address) where the packet/frame was received at the UPF 6, or the PDR which was applied by the UPF 6 to detect the packet/frame; and (iii) identifying the UE associated with the PDU Session or the NW-TT port in which the packet/frame was received. The FAR may also include: (a) indicating whether only the payload (L2 or L3 payload) or the complete packet/frame is being forwarded; and (b) indicating whether the TSN-AF 16 will send back a response message to be forwarded by UPF 6, and (if applicable) indicating, by PDU session(s) or NW-TT port(s), where the response is to be forwarded to by the UPF 6.

The configuration of a packet detection rule (PDR) filter entry for filtering packets including IEEE TSN control signalling at the UPF 6 may involve: the TSN-AF interacting with a policy control function (PCF) or a session management function (SMF) of the 5GS control plane to request configuration of such filtering; and the subsequent provision of one or more PDRs by the SMF to the UPF 6. Alternatively, the UPF 6 may use one or more filters pre-defined by the 3GPP 5GS protocol.

The filtering and forwarding of IEEE TSN control signalling messages at the UPF 6 may involve a single PDR and FAR for detecting and forwarding IEEE TSN control signalling messages for all UPF/NW-TT ports, i.e. the UPF 6 applies the same PDR and FAR regardless of at which UPF/NW-TT port the message was received. Alternatively, the filtering and forwarding of IEEE TSN control signalling messages at the UPF 6 may involve multiple PDRs and FARs: one PDR and FAR per UPF/NW-TT port.

In one example, the UPF 6 forwards the IEEE TSN control signalling to the TSN-AF 16 via the user plane using e.g. an encapsulation outer header. In other example, the UPF 6 forwards the IEEE TSN control signalling to the TSN-AF 16 via the 3GPP 5GS control plane using a general purpose container protocol that can be used for this forwarding regardless of how the IEEE control signalling may evolve with updating of the IEEE protocol. The transport of the IEEE-TSN control signalling uses a container that is opaque to the 5GS; the content does not matter to the transport of the container via the 3GPP 5GS control plane. For example, the IEEE control signalling may be forwarded from the UPF 6 to the TSN-AF 16 using a port management information container (PMIC) via one or more 5GS control plane interfaces and control plane functions. For example, the PMIC may be forwarded via the 5GS interface N4 to the session management function SMF, and from there to the TSN-AF 16 via a network exposure function (NEF).

FIGS. 4 and 5 show representations of operations of the DS-TT/UE functionality 12, 14 at the other side of the 5GS bridge 100 according to an example embodiment.

The DS-TT/UE 12, 14 receives TSN frames via one or more Ethernet links 2 from one or more end-point devices (STEP 400 and STEP 500).

According to one example shown in FIG. 5, the DS-TT/UE 12, 14 does not take any actions specific to Ethernet frames comprising TSN IEEE control signalling messages, but forwards all IEEE TSN messages (both data messages and control signalling messages) towards the UPF 6 (STEP 510); and the detection and forwarding of IEEE TSN control signalling messages is done at the UPF 6 in the same way as for IEEE TSN control signalling messages arriving at the UPF 6 via NW-TT. The UPF 6 operates according to the corresponding PDR/FAR to detect and forward IEEE TSN control signalling messages to the TSN-AF 16.

According to another example shown in FIG. 4, the DS-TT/UE 12, 14 detects IEEE TSN control signalling messages, and forwards IEEE TSN control signalling messages to the TSN-AF 16 via the 3GPP 5GS control plane (STEP 410). This may involve using a general purpose container protocol that can be used for this forwarding regardless of how the IEEE control signalling may evolve with updating of the IEEE protocol. The transport of the IEEE-TSN control signalling uses a container that is opaque to the 5GS; the content does not matter to the transport of the container via the 3GPP 5GS control plane. For example, the IEEE control signalling may be forwarded from the DS-TT/UE 12, 14 to the TSN-AF 16 using a port management information container (PMIC) via one or more 5GS control plane interfaces and control plane functions.

The rules for detecting and forwarding IEEE TSN control signalling messages from the DS-TT/UE 12, 14 to the TSN-AF 16 via the 5GS control plane may be pre-configured in the DS-TT/UE 12, 14. Alternatively, a UE route selection policy adopted at the DS-TT/UE 12, 14 may be configured by the 5GS SMF such that forwarding of user-plane traffic entering the 5G system at the DS-TT/UE 12, 14 to the TSN-AF 16 is possible.

FIG. 6 shows a representation of operations of the control plane translator application function TSN-AF 16 according to an example embodiment.

The TSN-AF 16 receives a IEEE TSN controlling signalling message (e.g. IEEE SRP/RAP message such as a MSRP message) from UPF 6 or from DS-TT/UE 12, 14 (STEP 600).

The TSN-AF 16 processes the IEEE TSN control signalling message received at the TSN-AF. This processing is done according to the IEEE protocol. This processing may involve the TSN-AF 16 interacting (STEP 610) with one or more control plane functions of the 5GS (such as the session management function (SMF)) via the 5GS network exposure function (NEF) using the NEF application programming interface (API). This interaction with one or more control plane functions of the 5GS may involve the TSN-AF making requests to the 5GS regarding the establishment of a new 5GS PDU session for a new TSN data stream across the 5GS bridge 100, or regarding re-configuration of an existing 5GS PDU session for an existing TSN data stream using the 5GS 100 as an IEEE TSN bridge.

The TSN-AF 16 prepares a IEEE TSN response message based on the result of the interactions with the one or more control plane functions of the 5GS (STEP 620).

The TSN-AF 16 directs the IEEE TSN response message (STEP 630) to the function from which it received the IEEE TSN control signalling message (i.e. UPF 6 or DS-TT/UE

12, 14) for user-plane forwarding out of the 5GS 100 via the N6 interface or to the IEEE TSN device connected to the DS-TT/UE 12, 14.

The transfer of the IEEE TSN response message to the UPF 6 or DS-TT/UE 12, 14 may be done via the user plane. Alternatively, the transfer of the IEEE TSN response message to the UPF 6 or DS-TT/UE 12, 14 may be done via the 3GPP control plane using a general purpose container protocol that can be used for this purpose regardless of how the IEEE control signalling may evolve with updating of the IEEE protocol. The transport of the IEEE-TSN control signalling uses a container that is opaque to the 5GS; the content does not matter to the transport of the container via the 3GPP control plane.

The above-described technique does not require the 3GPP protocol standards to specify IEEE protocol specific managed objects for the transport to the TSN-AF 16 of IEEE control plane messages detected at the UPF 6 or DS-TT/UE 12, 14, or for the transport of responses from the TSN-AF to the UPF 6 or DS-TT/UE 12, 14. The managed objects are opaque to the 5GS (their content does not matter to their transport via the 3GPP 5GS control plane). This reduces the coupling and linkages between the 3GPP and IEEE protocols, and better facilitates independent updating of the two protocols. For example, a 3GPP technical specification (TS) may be finished without waiting for the corresponding IEEE Standard to be finalized, and there is no need to update a 3GPP technical specification whenever an IEEE Standard evolves. The technique does not involve the selection by 3GPP of specific 802.1Q managed objects for inclusion in 3GPP standards, and the options for interworking between the 802.1Q network and the 5GS network are thus increased.

An example embodiment has been described above for the example of using 5GS 100 as an IEEE bridge in a TSN Fully Distributed Configuration model, but the technique also has other technical applications. For example, another use of the technique is in a TSN Centralized Network Distributed User configuration model represented in FIG. 8, in which a 5G system is the first hop bridge, or in any other IEEE 802.1 system involving in-band control signaling. The technique is also applicable to, for example, the combination of a 3GPP protocol with other protocols such as e.g. the Profinet protocol or the IEEE 802.1CS, Link Local Registration protocol.

An example embodiment has been described above for the example of processing messages requesting the use of 5GS resources. Other embodiments may alternatively or additionally involve processing messages regarding the use of 5GS services such as e.g. time information and topology information of devices connected to UE-side of the 5GS bridge.

Figure 9:
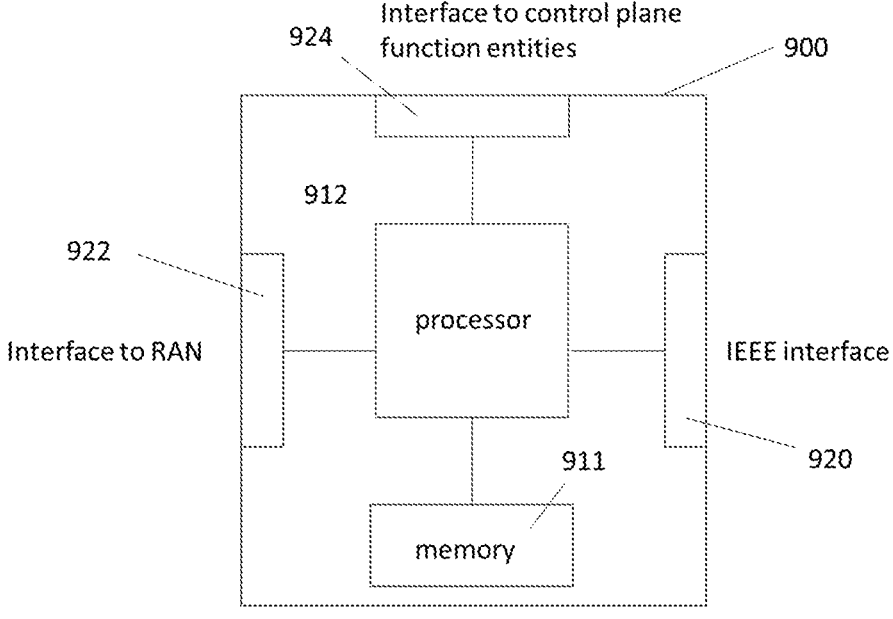
FIG. 9 shows a representation of an apparatus for implementing operations of a user plane function according to some example embodiments.

FIG. 9 illustrates an example of an apparatus 900 for implementing the operations of the user plane function described above. The apparatus may comprise at least one processor 912 coupled to one or more IEEE interfaces 920 at the edge of the 5G system 100, one or more interfaces 922 to one or more base stations (gNBs) of the RAN 10 of the 5G system 100, and one or more interfaces 924 to devices implementing control plane functions of the 5G system 100. The at least one processor 912 may be coupled to at least one memory 911. The at least one processor 912 may be configured to execute an appropriate software code 915 to perform the operations described above. The software code 915 may be stored in the memory 911.

Figure 10:
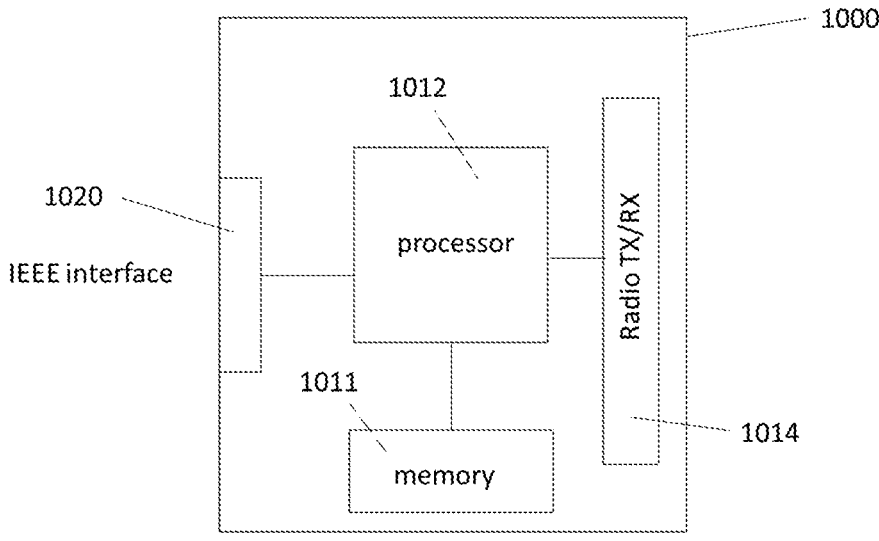
FIG. 10 shows a representation of an apparatus for implementing operations of a control plane translator function according to some example embodiments.

FIG. 10 illustrates an example of an apparatus 1000 for implementing the operations of the DS-TT/UE 12, 14 described above. The apparatus may comprise at least one processor 1012 coupled to one or more IEEE interfaces 1020 linked to one or more IEEE TSN devices, and to circuitry 1014 for making and receiving user plane and control plane radio transmissions, including one or more antenna arrays. The at least one processor 1012 may be coupled to memory 1011. The at least one processor may be configured to execute an appropriate software code to perform the operations described above. The software code may be stored in the memory 1011.

Figure 11:
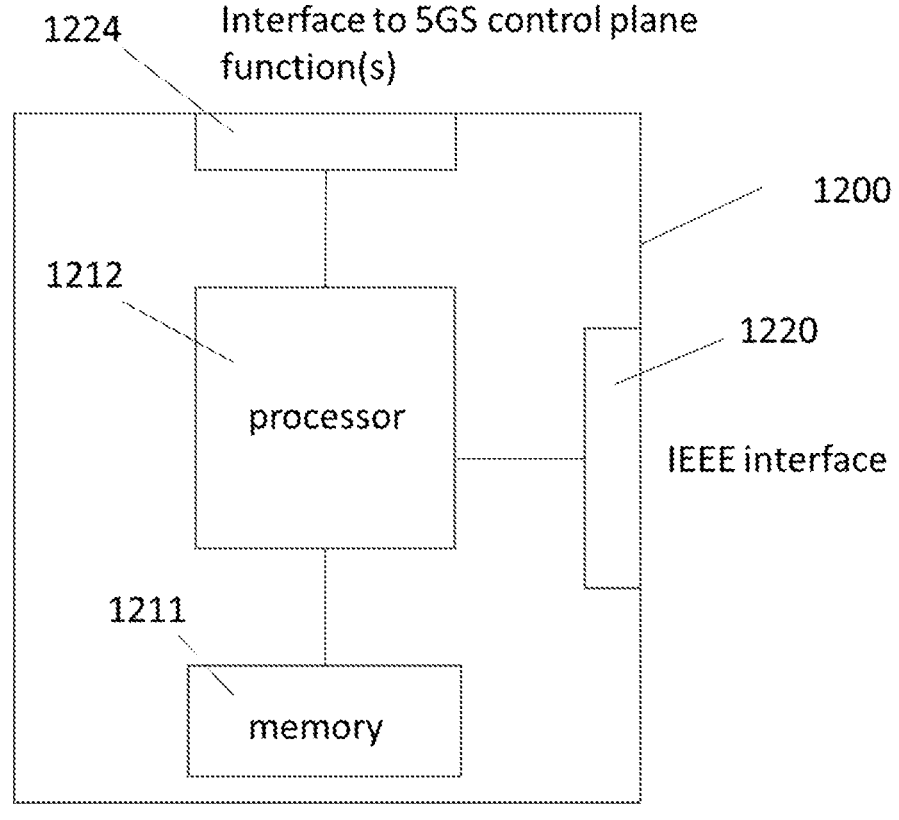
FIG. 11 shows a representation of an apparatus for implementing operations of a user equipment function according to some example embodiments.

FIG. 11 illustrates an example of an apparatus 1200 for implementing the operations of the control plane translator function TSN-AF 16 described above. The apparatus may comprise at least one processor 1212 coupled to one or more IEEE interfaces 1220, and interfaces 1224 to devices implementing one or more control plane functions of the 5G system 100. The at least one processor 1212 may be coupled to at least one memory 1211. The at least one processor 1212 may be configured to execute an appropriate software code to perform the operations described above. The software code may be stored in the memory 1211.

Figure 12:
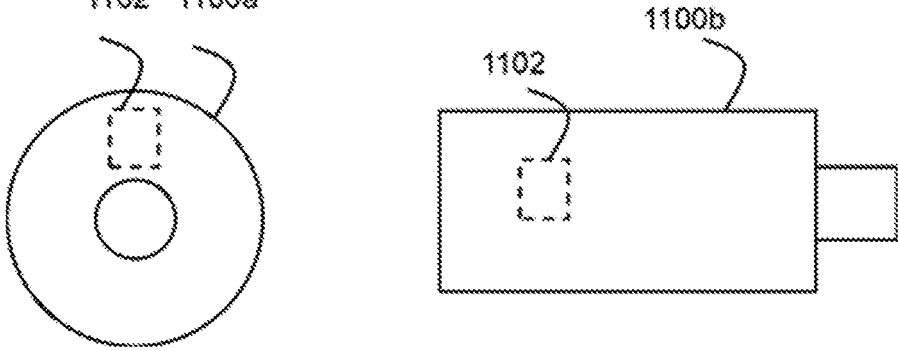
FIG. 12 shows a representation of non-volatile memory media.

FIG. 12 shows a schematic representation of non-volatile memory media 1100*a* (e.g. computer disc (CD) or digital versatile disc (DVD)) and 1100*b* (e.g. universal serial bus (USB) memory stick) storing instructions and/or parameters 1102 which when executed by a processor allow the processor to perform one or more of the steps of the methods described previously.

It is to be noted that embodiments of the present invention may be implemented as circuitry, in software, hardware, application logic or a combination of software, hardware and application logic. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer or smart phone, or user equipment.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

The described features, advantages, and characteristics of the invention can be combined in any suitable manner in one or more embodiments. One skilled in the relevant art will recognize that the invention can be practiced without one or more of the specific features or advantages of a particular embodiment. In other instances, additional features and advantages can be recognized in certain embodiments that may not be present in all embodiments of the invention. One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

The invention claimed is:

1. An apparatus comprising:

at least one processor; and at least one memory including computer program code for a user plane function of a system operating according to a first protocol, wherein the computer program code is configured to, when executed by the at least one processor, cause the apparatus to perform:

detecting a message comprising information regarding use of resources and services of the system for a service of a system operating according to a second protocol; and directing the message to a control plane function operating as a control plane translator between the first and second protocols, wherein detecting comprises identifying that the message comprises IEEE Time-Sensitive Networking control signaling including Multiple Stream Registration Protocol (MSRP) identified by an EtherType value, wherein directing comprises forwarding, in accordance with a forwarding action rule provided to the user plane function by a session management function, the message to the control plane translator, the forwarding action rule: (i) sets the control plane translator as a destination interface, (ii) identifies at least one of a receive interface, a packet detection rule applied at the user plane function, a user equipment associated with a packet data unit session, or a network TSN translator port at which the message was received, (iii) indicates whether only a payload or an entire frame is forwarded, and (iv) indicates whether a response is expected and, if so, a packet data unit session or network TSN translator port for forwarding the response, and wherein directing comprises encapsulating the control signaling in a port management information container transported via one or more control plane interfaces from the user plane function to a session management function over N4 and from the session management function to the control plane translator via a network exposure function, the container being opaque to the system.

2. The apparatus according to claim 1, wherein the computer program code is configured to, when executed by the at least one processor, cause the apparatus to direct the message to the control plane function via a user plane of the system operating according to the first protocol.

3. The apparatus according to claim 2, wherein the computer program code is configured to, when executed by the at least one processor, cause the apparatus to add an encapsulation outer header to the message.

4. The apparatus according to claim 1, wherein the computer program code is configured to, when executed by the at least one processor, cause the apparatus to direct the message to the control plane function via a control plane of the system operating according to the first protocol.

5. The apparatus according to claim 4, wherein the computer program code is configured to, when executed by the at least one processor, cause the apparatus to direct the message to the control plane function via the control plane of the system operating according to the first protocol using a container protocol.

6. The apparatus according to claim 5, wherein the computer program code is configured to, when executed by the at least one processor, cause the apparatus to direct the message to the control plane function via the control plane of the system using a port management information container.

7. The apparatus according to claim 1, wherein the message is a stream reservation message or a resource allocation message according to the second protocol.

8. The apparatus according to claim 1, wherein the message comprises information regarding use of the resources of the system and wherein the resources of the system comprise radio resources.

9. The apparatus according to claim 1, wherein the first protocol is a 3GPP protocol and the second protocol is an IEEE protocol.

10. An apparatus comprising:

at least one processor; and at least one memory including computer program code for a user equipment function operating according to a first protocol in a system, wherein the computer program code is configured to, when executed by the at least one processor, cause the apparatus to perform:

detecting a message comprising information regarding use of resources and services of the system for a service of a system operating according to a second protocol; and directing the message from the user equipment function to a user plane function of the system for forwarding to a control plane function operating as a control plane translator between the first and second protocols, wherein the user plane function forwards the message in accordance with a forwarding action rule provided by a session management function and encapsulates the message in a port management information container transported over one or more control plane interfaces from the user plane function to the session management function over N4 and from the session management function to the control plane function via a network exposure function, the port management information container being opaque to the system.

11. The apparatus according to claim 10, wherein detecting comprises identifying that the message comprises IEEE Time-Sensitive Networking control signaling including Multiple Stream Registration Protocol (MSRP) identified by an EtherType value; and wherein the forwarding action rule and the port management information container include metadata that: identifies at least one of a receive interface at which the message was received, a packet detection rule applied at the user plane function, a packet data unit session associated with the user equipment, or a network TSN translator port; indicates whether only a payload or a complete frame is forwarded; and indicates whether a response is expected and, if so, a packet data unit session or network TSN translator port to which the response is to be forwarded.

12. The apparatus according to claim 11, wherein the EtherType value equals hexadecimal 0x22EA indicating Multiple Stream Registration Protocol (MSRP).

13. The apparatus according to claim 12, wherein the message comprises an IEEE stream reservation protocol (SRP) message or an IEEE resource allocation protocol (RAP) message.

14. The apparatus according to claim 13, wherein the message comprises information regarding use of resources of the system and the resources comprise radio resources, and wherein the encapsulation uses a container protocol implemented over one or more control plane interfaces of the system.

15. The apparatus according to claim 10, wherein the first protocol is a 3GPP protocol and the second protocol is a IEEE protocol and wherein the forwarding action rule provided by the session management function: sets the control plane translator as a destination interface, identifies at least one of a receive interface or a packet detection rule applied at the user plane function and a user equipment associated with a packet data unit session or a network TSN translator port, indicates whether only a payload or an entire frame is forwarded, and indicates whether a response is expected and, if so, a packet data unit session or network TSN translator port to which the response is to be forwarded.

16. An apparatus comprising:
at least one processor; and
at least one memory including computer program code for
a first control plane function of a system operating according to a first protocol, wherein computer program code is configured to, when executed by the at least one processor, cause the apparatus to perform:
receiving from a user plane function or user equipment function of the system operating according to the first protocol, a message comprising information regarding use of resources and services of the system for a service of a system operating according to a second protocol, wherein the first control plane function operates as a control plane translator between the first and second protocols;
interacting with a second control plane function of the system in relation to the message;
preparing a response to the message; and

16 directing the response to the user plane function or user equipment function for user plane forwarding to a node operating according to the second protocol,
wherein receiving comprises receiving, via a network exposure function, a port management information container that encapsulates IEEE Time-Sensitive Networking control signaling forwarded over one or more 5G control plane interfaces from a session management function, the container being opaque to the system, and wherein directing the response comprises returning the response using the port management information container over the 5G control plane.

17. The apparatus according to claim 16, wherein the computer program code is configured to cause the apparatus to direct the response to the user plane function or user equipment function via a user plane of the system operating according to the first protocol.

18. The apparatus according to claim 16, wherein the computer program code is configured to cause the apparatus to direct the response to the user plane function or user equipment function via a control plane of the system operating according to the first protocol.

19. The apparatus according to claim 18, wherein the computer program code is configured to cause the apparatus to direct the response to the user plane function or user equipment function via the control plane using a container protocol.

20. The apparatus according to claim 19, wherein the computer program code is configured to cause the apparatus to direct the response to the user plane function or user equipment function via the control plane of the system using a port management information container.

21. The apparatus according to claim 16, wherein the message is a stream reservation message or a resource allocation message according to the second protocol.

22. The apparatus according to claim 16, wherein the message comprises information regarding use of the resources of the system operating according to the second protocol and wherein the resources comprise radio resources.

23. The apparatus according to claim 16, wherein the first protocol is a 3GPP protocol and the second protocol is a IEEE protocol.

* * * * *